United States Patent [19]

Largent et al.

[11] Patent Number: 5,693,133
[45] Date of Patent: Dec. 2, 1997

[54] ASBESTOS FREE ROOF COATINGS

[75] Inventors: William J. Largent, Darien; Charles Kaloczi, Bolingbrook, both of Ill.

[73] Assignee: Akzo Nobel nv, Arnhem, Netherlands

[21] Appl. No.: 438,327

[22] Filed: May 10, 1995

[51] Int. Cl.$^6$ ................................. C09D 101/00
[52] U.S. Cl. ..................... 106/284.06; 106/284.4; 106/416
[58] Field of Search .............. 106/284.06, 284.4, 106/416

[56] References Cited

U.S. PATENT DOCUMENTS

| | | | |
|---|---|---|---|
| 3,738,852 | 6/1973 | Doi et al. | 106/277 |
| 3,923,960 | 12/1975 | Leigh | 423/265 |
| 4,302,370 | 11/1981 | Buse | 260/28.5 |
| 4,494,992 | 1/1985 | Schilling et al. | 106/277 |
| 4,496,474 | 1/1985 | Reck | 106/277 |
| 4,547,224 | 10/1985 | Schilling | 106/273 |
| 4,759,799 | 7/1988 | Vicenzi | 106/273 |
| 4,780,146 | 10/1988 | Chang | 106/273 |
| 4,836,857 | 6/1989 | Hopkins | 106/284.4 |
| 4,859,245 | 8/1989 | Schilling et al. | 106/284.4 |
| 4,877,457 | 10/1989 | Schilling et al. | 106/277 |
| 5,224,990 | 7/1993 | Vicenzi | 106/277 |
| 5,362,314 | 11/1994 | Vicenzi | 106/284.06 |

FOREIGN PATENT DOCUMENTS

| | | | |
|---|---|---|---|
| 913053 | 10/1972 | Canada | 253/19 |
| 51-146521 | 12/1975 | Japan . | |

*Primary Examiner*—Mark D. Sweet
*Attorney, Agent, or Firm*—Ralph J. Mancini; Louis A. Morris

[57] ABSTRACT

The present invention generally relates to an asbestos-free roof coating composition which comprises roof-coating asphalt cutback, an amine-based dispersion aid and various optional ingredients including fillers to obtain the desired bulk. The dispersion aid is an organic or inorganic acid neutralized salt of a polyamine of the formula:

$$R-NH_2$$

wherein R is a $C_3C_{26}$ coco-alkyl radical.

18 Claims, No Drawings

ASBESTOS FREE ROOF COATINGS

FIELD OF THE INVENTION

The present invention generally relates to an asbestos-free roof coating composition which comprises, as a surface active agent, an amine based dispersion aid.

BACKGROUND OF THE INVENTION

Asbestos is a common ingredient in asphalt-based coating compositions such as roof coatings and roof cements. Asbestos has, however, fallen out of public favor and its use has been prohibited in many places because of toxicity problems and its suspected carcinogenic behavior. Thus, it is desirable to find a suitable substitute for asbestos in roof coatings.

U.S. Pat. No. 4,759,799 discloses an asbestos-free, asphalt-based, roof coating composition which include asphalt cutback, clay, a surfactant, and fillers. An alkyloxyalkylamine salt surfactant, preferably an alkyloxypropylamine salt having an alkyl chain with from 10 to 20 carbon atoms is utilized in combination with clay in order to obtain a coating which allegedly exhibits stable gel structure and acceptable blending properties.

Japanese Patent No. 51 146-521 discloses a rubberized asphalt emulsion which comprises a cationic, nonionic or amphoteric asphalt emulsion and rubber latex. Alkylamine formates are employed as stabilizing agents and to prevent latex separation.

U.S. Pat. No. 4,302,370 discloses asbestos-free asphalt compositions used in roof applications. A polypropylene carbonate coupling agent employed with high density polyethylene fibers to prevent settling or separation of the components.

U.S. Pat. No. 4,780,146 discloses an asphalt composition which comprises a bituminous material blended with a reaction product of ethylene diamine and a blend of dibasic acid and one or more fatty acid residues.

U.S. Pat. No. 3,378,852 describes an asphalt-in-water emulsion in which there is an emulsifier comprised of a mixture of a water-soluble salt of a monoamine having a long chain alkyl or alkenyl group of 8 to 22 carbon atoms and a water-soluble salt of a triamine having a long chain alkyl or alkenyl group of 8 to 12 carbon atoms.

Finally, U.S. Pat. No. 5,224,990 discloses a surfactant modified bituminous emulsion. The surfactant is selected from the group consisting of neutral polyamines, partially and fully acid-neutralized polyamine salts, and mixtures thereof.

These formulations fail, however, to meet desired performance characteristics and experience numerous drawbacks such as cost, corrosiveness, use of flammable solvents, and insufficient gelling properties and stability. Thus, there is a need for an improved asbestos-free roof coating composition that meets performance objectives.

It is therefore an object of the invention to provide an improved asbestos-free roof coating with improved gel structure and stability.

It is a further object to provide an improved asbestos-free roof coating which requires less surfactant and is easier to blend.

Finally, it is an object of this invention to provide an asbestos-free roof coating with reduced toxicity, flammability and corrosiveness.

These and other objects will be apparent from the description of the invention provided below.

SUMMARY OF THE INVENTION

The present invention generally relates to an asbestos-free roof coating composition which comprises roof-coating asphalt cutback, an amine-based dispersion aid and various optional ingredients including fillers to obtain the desired bulk.

DETAILED DESCRIPTION OF THE INVENTION

The present invention relates to an asbestos-free roof coating composition with improved gelling properties and stability. The composition comprises asphalt cutback, an amine-based dispersion aid, and various optional ingredients including fillers, coupling agents and the like. The performance of the amine-based dispersion aid is such that it allows one to eliminate the need of asbestos, without sacrificing gel structure and stability.

A typical composition comprises 30–98% by weight asphalt cutback, 2–70% by weight clay, fillers in an amount to provide the desired bulk and an effective amount of a dispersion aid to provide the desired gel qualities and stability.

The asphalt cutback employable in the present invention generally comprises asphalt and solvent, which when combined in appropriate proportions, gives a pumpable liquid. Asphalt cutbacks of the rapid-cure, medium-cure and slow-cure varieties are all employable in the context of the present invention.

Any asphalt suitable for roofing purposes can be employed in the asphalt cutback utilized in the present invention, including natural asphalt, and asphalt obtained as a residue in petroleum refining, including asphalt which has been air and/or steam blown. Asphalt tested according to the procedure outlined in the American Society of Testing Materials Standard (ASTM) D-5-73 penetration test and characterized by penetration at 77° F. (Fahrenheit) between about 0 and about 100 dmm (tenths of a millimeter) and having a ring and ball softening point between about 80° F. and about 240° F. are preferred. The preferred material is a catalytically blown asphalt having a penetration at 77° F. between 60 to 75 dmm, and a ring and ball softening point between 135° to 150° F.

The solvent utilized in the asphalt cutback can be any conventionally employed solvents including, but are not limited to Stoddard solvent, naphtha, mineral spirits, No. 2 fuel oil and the like.

The asphalt cutback of the present invention comprises between about 30 to 98 weight percent asphalt and between about 2 to 70 weight percent solvent for said asphalt. While the amount of solvent in the asphalt cutback can be broadly within the range given above, it will be understood that the amount of solvent used in a particular composition will depend, at least in part, upon the particular solvent and asphalt used as well as the temperature at which the composition of the invention is to be used.

Clays suitable for employment in the present invention include any type and/or quality of clay conventionally employed in asphalt-based roof coatings including but not limited to bentonite, ball, attapulgite or kaolin clays. Clays of the foregoing type are employed to provide a thickening or gelation to the asphalt cutbacks and/or dispersion aids and/or clay mixtures.

The amine-based dispersion aid of the present invention preferably comprises organic or inorganic acid-partially or fully neutralized polyamine salts. Any organic and/or inorganic acids can be employed in the neutralization reaction including but not limited to formic acid, acetic acid, propionic acid, 2-ethyl hexanoic acid, 2-ethylbutyric acid, hydrochloric acid, sulfuric acid, 2-methyl propionic acid, mixtures thereof and the like. Acetic acid and 2-methyl propionic acid are especially preferred.

Preferred polyamines employable in the neutralization reaction include but are not limited to polyamines of the formula:

$$R\text{—}NH_2$$

wherein: R is an alkyl group having from 3–28 carbon atoms.

More preferably, the polyamine is a $C_8$–$C_{16}$ coco-alkyl amine, with the most preferred coco-alkyl amine being a $C_{12}$–$C_{14}$ coco-alkyl amine. Examples of most preferred polyamines are sold by Akzo Nobel Chemicals Inc. are sold under the Armeen trademark. Preferred examples include but are not limited to Armeen CD, Armeen C, Armeen T, Armeen TD, Armeen L8D, Armeen 12, Armeen 12D, Armeen S, and Armeen SD.

In one embodiment, the dispersion aid is a simple amine salt prepared by a one-step neutralization of coco-alkyl amines with 2-methyl propionic acid, as shown by the following reaction:

$$RNH_2 + CH_3CH(CH_3)COOH \rightarrow RNH_3^+ \,^-OOCCH(CH_3)CH_3$$

The dispersion aid of the present invention, when included in optimum effective amounts, provides stability to the roof coating compositions and prevents or minimizes any phase separation in the composition. Determining the optimum amount of dispersion aid is critical to the invention. The ideal amount, i.e., an effective amount of dispersion aid is that amount which is effective in providing the best gel structure and stability to a given roof coating composition. This amount is dependent on the type and amount of asphalt cutback employed, the degree of asphalt oxidation, the type and quality of clay employed and, of course, the type dispersion aid employed. Therefore, the effective amount of dispersion aid must be determined for each specific combination of ingredients. Typically, an effective amount of dispersion aid or mixture of dispersion aids comprises from about 0.01% by weight to about 15% by weight of the roof coating composition. More preferably, an effective amount of dispersion is from about 0.05% to about 10% by weight of the composition. In a most preferred embodiment, the roof coating composition of the present invention contains from 0.1% to about 5% by weight of at least one dispersion aid.

Fillers are generally employed as bulking agents which reinforce the composition after application to the desired surface. They are also utilized for economic consideration and shrinkage control. Any fillers conventionally in roof coating compositions can be usefully employed in the present invention. Examples of suitable fillers include, but are not limited to sand, mica, ground slate, diatomaceous earth, ground limestone, wollastonite, pearlite, cellulosic fibers, talc, and polyolefin fibers. Fillers are added in amounts as needed to provide desired properties in the composition. The composition of the present invention preferably contains from about 0–30% by weight filler, more preferably, from about 2–15% by weight filler.

The composition of the present invention are generally pseudoplastic and thixotropic, as demonstrated by their relatively high viscosity at low shear rates; their relatively low viscosity at high shear rates; their good uniformity in viscosity reduction in response to uniform shear applied over a period of time; and their good recoverability, that is, recovery of initial properties after shear has ended.

The gel strength contributes to stabilizing the final coating composition against settling over long periods in storage. The high viscosity at low shear rates maintains mix uniformity during processing, packaging and application. The low viscosity at high shear rates makes application easier. And the good recoverability of viscosity minimizes sag and flow after application while the solvent evaporation is occurring.

In a preferred embodiment, the invention contemplates an asbestos-free, roof coating composition of the present invention comprises from about 50–98% by weight asphalt cutback, from about 2–50% by weight clay; from about 0–30% by weight fillers and dispersion aid in an amount effective to provide the desired gel qualities and stability.

In another preferred embodiment, the invention provides an asbestos-free roof coating composition which comprises from 70–98% by weight asphalt cutback, from about 2–30% by weight clay; from about 2–15% by weight filler and from about 0.05% to about 10% by weight dispersion aid.

In a most preferred embodiment, the asbestos-free roof coating composition of the present invention comprises from about 80% to 98% by weight asphalt cutback; from about 2% to about 20% by weight clay; from about 2% to about 15% by weight filler and from about 0.5% to about 5.0% by weight dispersion aid.

The present invention relates to a method for preparing an asbestos-free asphalt-based roof coating composition which comprises the steps of adding asphalt cutback, clay and filler to a mixing vessel and slowly mixing same until thoroughly blended. The dispersion aid is thereafter added to the mixing vessel and the contents of the vessel are mixed until thoroughly blended in order to obtain an asbestos-free roof coating composition.

Alternatively, all of the ingredients can be added to the mixing vessel at the same time, preferable under agitation, and the total contents of the vessel mixed until thoroughly blended.

The present inventors have also found that the dispersion aid can effectively be dissolved into the asphalt cutback at temperatures wherein the cutback is fluid, typically 40–140° F. The remaining ingredients can then be added to the mixing vessel and the contents thoroughly blended to obtain the final composition.

In still another preparatory method, the clay can be pretreated with dispersion aid and added to the mixing vessel before, after or at the same time as the remaining ingredients.

The invention will now be illustrated by the following nonlimiting examples.

PREPARATION OF THE DISPERSION AID

The dispersion aid is prepared by stirring the primary fatty alkylamine in a reaction flask and thereafter slowly adding an acid, such as isobutyric acid, to the stirred amine. The exothermic reaction results in the formation of the amine salt dispersion aid. Various other amine salts can be prepared in a similar manner by one of ordinary skill in the art.

GENERAL PREPARATIVE PROCEDURE FOR THE EXAMPLES

Cutback asphalt and a suitable mixing bowl are preheated to 140° F. to facilitate handling, and cutback asphalt is charged to the mixing bowl. Dispersion aid is then added to the cutback asphalt and the combination is mixed on a Hobart mixer using setting #1 for five minutes. Clay and fillers are then added and the combination is mixed on a Hobart mixer for one minute using setting #1. After one minute, the mixing speed is increased to setting #2 and the combination mixed for an additional four minutes after which the stirring is momentarily stopped and the sides of the bowl are scraped down using a spatula. Finally, the combination is mixed for five minutes at setting #2 and poured into a suitable container for evaluation at a later point in time.

EXAMPLES

The asbestos-free roof coating compositions employed in the Examples were prepared by mixing the ingredients listed in Table I in accordance with the foregoing preparative scheme. The types and amounts of the various dispersion aids were optimized by comparing the resultant viscosity and gel characteristics of the finished roof coating composition. The gel characteristics of the compositions of the examples were compared using a standard Brookfield viscometer. Viscosity measurements were taken approximately twenty four hours after preparation at ambient temperature in accordance with ASTM D2196–81, and the data is tabulated in Table II, below.

TABLE I

| COMPARATIVE EXAMPLE 1 | |
|---|---|
| Cutback Asphalt A | 688.9 parts |
| Dispersion aid | None |
| Clay | 100.0 parts |
| EXAMPLE 2 | |
| Cutback Asphalt A | 698.9 parts |
| Amine salt: Armeen ® Isobutyric acid | 11.1 parts |
| Clay | 100.0 parts |
| EXAMPLE 3 | |
| Cutback Asphalt A | 688.9 parts |
| Amine salt: Armeen ® CD 2-Ethylbutyric acid | 11.1 parts |
| Clay | 100.0 parts |
| EXAMPLE 4 | |
| Cutback Asphalt A | 688.9 parts |
| Amine salt: Armeen ® CD, 2-ethyl hexanoic acid | 11.1 parts |
| Clay | 100.0 parts |
| EXAMPLE 5 | |
| Cutback Asphalt A | 688.9 parts |
| Amine salt: Armeen ® CD, acetic acid | 11.1 parts |
| Clay | 100.0 parts |
| EXAMPLE 6 | |
| Cutback Asphalt A | 688.9 parts |
| Amine salt: PA-14 Acetate | 11.1 parts |
| Clay | 100.0 parts |

*Asphalt A = Trumbull asphalt
*Clay = Attagel 36 purchased from Engelhard Corporation
*PA-14 Acetate is an ether amine acetate salt commercially available from Exxon Chemical.

TABLE II

| VISCOSITY OF SAMPLES | |
|---|---|
| EXAMPLE NO. | BROOKFIELD VISCOSITY CENTIPOISE AT 25° C. |
| COMPARATIVE EX. 1 | 3,000 |
| EXAMPLE 2 | 164,800 |
| EXAMPLE 3 | 104,000 |
| EXAMPLE 4 | 66,000 |
| EXAMPLE 5 | 166,000 |
| COMPARATIVE EX. 6 | 51,200 |

As the data in Table II clearly show, the addition of the dispersion aid of the present invention results in a dramatic improvement in viscosity of the claimed asbestos-free, roof coating compositions of the present invention, without the necessity of employing asbestos.

We claim:

1. An asbestos-free asphalt roof coating composition which comprises about 50–98% by weight asphalt cutback and an effective amount of at lease one dispersion aid which comprises an organic or inorganic acid neutralized salt of a polyamine.

2. The composition of claim 1 wherein said polyamine has the general formula:

$$R-NH_2$$

wherein R is a $C_3-C_{26}$ coco-alkyl radical.

3. The composition of claim 2 wherein R is a $C_8-C_{16}$ coco-alkyl radical.

4. The composition of claim 1 which additionally comprises clay and filler.

5. The composition of claim 1 which comprises from about 50% to about 98% by weight asphalt cutback; from about 2% to about 70% by weight clay; from about 0% to about 30% by weight filler; and dispersion aid in an amount effective to provide the desired gel characteristics and stability.

6. The composition of claim 5 which comprises from about 50–98% by weight asphalt cutback, from about 2–50% by weight clay; from about 2–15% by weight filler and from about 0.01% to about 20% by weight dispersion aid.

7. The composition of claim 6 which comprises from about 80–98% by weight asphalt cutback, from about 2–20% by weight clay; from about 2–15% by weight filler and from about 0.1% to about 5% by weight dispersion aid.

8. The composition of claim 1 wherein said dispersion aid is the reaction product of a
   (i) compound of the formula:

$$RNH_2$$

wherein R is a $C_3-C_{26}$ alkyl; and
   (ii) an organic or inorganic acid selected from the group consisting of formic acid, acetic acid, propionic acid, 2-ethylbutyric acid, hydrochloric acid, sulfuric acid, 2-methyl propionic acid, 2-ethyl hexanoic acid and mixtures thereof.

9. An asbestos-free asphalt roof coating composition which comprises about 50–98% by weight asphalt cutback and an effective amount of at least one dispersion aid which is the reaction product of polyamine of the general formula:

$$R-NH_2$$

wherein R is a $C_3-C_{26}$ coco-alkyl radical, and an organic or inorganic acid selected from the group consisting of formic acid, acetic acid, propionic acid, 2-ethylbutyric acid, hydrochloric acid, sulfuric acid, 2-methyl propionic acid, 2-ethyl hexanoic acid and mixtures thereof.

10. The composition of claim 9 wherein said dispersion aid is the reaction product of a $C_8$–$C_{16}$ coco-alkyl amine and an acid selected from formic acid, acetic acid, propionic acid, hydrochloric acid, sulfuric acid, 2-methyl propionic acid, 2-ethyl hexanoic acid and mixtures thereof.

11. The composition of claim 9 wherein said dispersion aid is the reaction product of a $C_{12}$–$C_{14}$ coco-alkyl amine and an acid selected from formic acid, acetic acid, propionic acid, 2-ethylbutyric acid, hydrochloric acid, sulfuric acid, 2-methyl propionic acid, 2-ethyl hexanoic acid and mixtures thereof.

12. The composition of claim 9 which comprises from about 80–98% by weight asphalt cutback, from about 2–20% by weight clay; from about 2–15% by weight filler and from about 0.1% to about 5% by weight dispersion aid.

13. A method for preparing an asbestos-free asphalt-based roof coating which comprises combining in a mixing vessel, about 50–98% by weight asphalt cutback, clay, 0–30 parts filler, and from about 0.01 to about 20 parts by weight of aid least one dispersion aid which comprises an organic or inorganic acid neutralized salt of a polyamine to said vessel, and thoroughly blending the contents of the vessel in order to obtain a stable, asbestos-free roof coating composition.

14. The method of claim 13 wherein said dispersion aid is the reaction product of a (i) compound of the formula:

$RNH_2$ wherein R is a $CH_3$–$C_{26}$ alkyl; and (ii) an organic or inorganic acid selected from the group consisting of formic acid, acetic acid, propionic acid, hydrochloric acid, sulfuric acid, 2-methyl propionic acid, 2-ethyl hexanoic acid and mixtures thereof.

15. The method of claim 13 wherein R is a $C_8$–$C_{16}$ coco-alkyl.

16. The method of claim 13 wherein said clay is treated with said dispersion aid prior to addition to the mixing vessel.

17. A method for preparing an asbestos-free, asphalt-based roof coating which comprises the steps dissolving at least one dispersion aid which comprises an organic or inorganic acid partially or fully neutralized salt of a polyamine into about 50–98% by weight asphalt cutback, and thoroughly mixing same with clay and 0–30 parts filler in order to obtain a stable, asbestos-free roof coating composition.

18. The method of claim 17 wherein said dispersion aid is the reaction product of a $C_8$–$C_{16}$ coco-alkyl amine and an acid selected from formic acid, acetic acid, propionic acid, hydrochloric acid, sulfuric acid, 2-methyl propionic acid, 2-ethyl hexanoic acid and mixtures thereof.

* * * * *